(12) United States Patent
Niwa

(10) Patent No.: US 12,525,028 B2
(45) Date of Patent: Jan. 13, 2026

(54) CONTACT OBJECT DETECTION APPARATUS AND NON-TRANSITORY RECORDING MEDIUM

(71) Applicant: SUBARU CORPORATION, Tokyo (JP)

(72) Inventor: Hitoshi Niwa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 330 days.

(21) Appl. No.: 18/333,131

(22) Filed: Jun. 12, 2023

(65) Prior Publication Data

US 2024/0005669 A1     Jan. 4, 2024

(30) Foreign Application Priority Data

Jul. 1, 2022   (JP) ................................ 2022-107329

(51) Int. Cl.
*G06V 20/58*    (2022.01)
*B60W 30/18*    (2012.01)

(52) U.S. Cl.
CPC ....... *G06V 20/58* (2022.01); *B60W 30/18036* (2013.01); *B60W 2420/403* (2013.01); *B60W 2420/54* (2013.01); *B60W 2554/20* (2020.02); *B60W 2554/4049* (2020.02)

(58) Field of Classification Search
CPC ............ G06V 20/58; B60W 30/18036; B60W 2420/403; B60W 2420/54; B60W 2554/20; B60W 2554/4049; B60W 30/0953; B60W 30/0956; B60W 50/14; B60W 2050/0075; B60W 2520/10; B60W 2540/18; G01S 7/52004; G01S 15/86; G01S 15/931

See application file for complete search history.

(56) References Cited

U.S. PATENT DOCUMENTS

| 2020/0242937 | A1* | 7/2020 | Omiya | G08G 1/168 |
| 2020/0401825 | A1* | 12/2020 | Ohkado | G06T 7/70 |
| 2021/0190605 | A1* | 6/2021 | Kawahara | G01S 15/04 |
| 2022/0036043 | A1* | 2/2022 | Sakashita | G01S 13/931 |

FOREIGN PATENT DOCUMENTS

JP        2019-159380 A       9/2019

* cited by examiner

*Primary Examiner* — Oneal R Mistry
*Assistant Examiner* — Rachel L Roberts
(74) *Attorney, Agent, or Firm* — Rimon P.C.

(57) ABSTRACT

A contact object detection apparatus includes an on-road static object detector, a sonar sensor, a position estimator, a corrector, and a contact object determination unit. The on-road static object detector detects an on-road static object from an image of an environment behind a vehicle to calculate a position of the object. When the object is no longer detectable, the position estimator estimates a current position of the object based on the last position detected by the on-road static object detector, traveling speed data, and steering angle data, to calculate an angle between a center axis of the sonar sensor and the estimated current position. The corrector corrects a decrease in a sensor output value of the sonar sensor based on the calculated angle. The contact object determination unit determines whether the object has a possibility of contact with the vehicle, based on the corrected sensor output value.

11 Claims, 11 Drawing Sheets

CONTACT OBJECT DETECTION APPARATUS AND NON-TRANSITORY RECORDING MEDIUM

CROSS-REFERENCE TO RELATED APPLICATIONS

The present application claims priority from Japanese Patent Application No. 2022-107329 filed on Jul. 1, 2022, the entire contents of which are hereby incorporated by reference.

BACKGROUND

The disclosure relates to a contact object detection apparatus and a non-transitory recording medium.

Driving assistance systems have been put into practical use and widely used in recent years that assist safety driving of vehicles while reducing burdens on driver's operations of the vehicles.

For example, a known driving assistance system detects an object present around a vehicle while the driver is traveling the vehicle in a backward direction, and issues a notification calling for attention of the driver when the detected object has a possibility of contact with the vehicle.

As the driving assistance system that detects an object present around a vehicle and having a possibility of contact with the vehicle, a system including a camera and a sonar sensor has been proposed, for example. The system detects the object having a possibility of contact with the vehicle based on an image of a surrounding environment of the vehicle captured by the camera and a sensor output value outputted by the sonar sensor. Reference is made to, for example, Japanese Unexamined Patent Application Publication No. 2019-159380.

SUMMARY

An aspect of the disclosure provides a contact object detection apparatus to be applied to a vehicle. The contact object detection apparatus includes an on-road static object detector, a sonar sensor, a position estimator, a corrector, and a contact object determination unit. The on-road static object detector is configured to detect an on-road static object from a captured image of an environment behind the vehicle, and calculate a position of the on-road static object. The sonar sensor is configured to receive a reflective wave from the on-road static object to output a sensor output value based on the reflective wave. The position estimator is configured to, when the on-road static object is no longer detectable by the on-road static object detector due to traveling of the vehicle in a backward direction, estimate a current position of the on-road static object, based on the last position of the on-road static object detected by the on-road static object detector, traveling speed data regarding the vehicle, and steering angle data regarding the vehicle, to calculate an angle between a center axis of the sonar sensor and the current position of the on-road static object estimated by the position estimator. The corrector is configured to correct a decrease in the sensor output value caused by a decrease in detection sensitivity of the sonar sensor, based on the angle calculated by the position estimator. The contact object determination unit is configured to determine whether the on-road static object is an object having a possibility of contact with the vehicle, based on the sensor output value corrected by the corrector.

An aspect of the disclosure provides a non-transitory computer readable recording medium containing a program that causes, when executed by a computer, the computer to implement a method of detecting a contact object having a possibility of contact with a vehicle using a contact object detection apparatus. The contact object detection apparatus includes an on-road static object detector, a sonar sensor, a position estimator, a corrector, and a contact object determination unit. The method includes: detecting, with the on-road static object detector, an on-road static object from a captured image of an environment behind the vehicle to calculate a position of the on-road static object; receiving, with the sonar sensor, a reflective wave from the on-road static object to output a sensor output value based on the reflective wave; when the on-road static object is no longer detectable by the on-road static object detector due to traveling of the vehicle in a backward direction, estimating, with the position estimator, a current position of the on-road static object based on the last position of the on-road static object detected by the on-road static object detector, traveling speed data regarding the vehicle, and steering angle data regarding the vehicle, to calculate an angle between a center axis of the sonar sensor and the current position of the on-road static object estimated by the position estimator; correcting, with the corrector, a decrease in the sensor output value caused by a decrease in detection sensitivity of the sonar sensor, based on the angle calculated by the position estimator; and determining, with the contact object determination unit, whether the on-road static object is the object having the possibility of the contact with the vehicle based on the sensor output value corrected by the corrector.

An aspect of the disclosure provides a contact object detection apparatus to be applied to a vehicle. The contact object detection apparatus includes a sonar sensor and circuitry. The sonar sensor is configured to receive a reflective wave from an on-road static object to output a sensor output value based on the reflective wave. The circuitry is configured to: detect an on-road static object from a captured image of an environment behind the vehicle; calculate a position of the on-road static object; when the on-road static object is no longer detectable due to traveling of the vehicle in a backward direction, estimate a current position of the on-road static object based on the last detected position of the on-road static object, traveling speed data regarding the vehicle, and steering angle data regarding the vehicle; calculate an angle between a center axis of the sonar sensor and the current position of the on-road static object estimated; correct a decrease in the sensor output value caused by a decrease in detection sensitivity of the sonar sensor, based on the angle calculated; and determine whether the on-road static object is an object having a possibility of contact with the vehicle, based on the sensor output value corrected.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
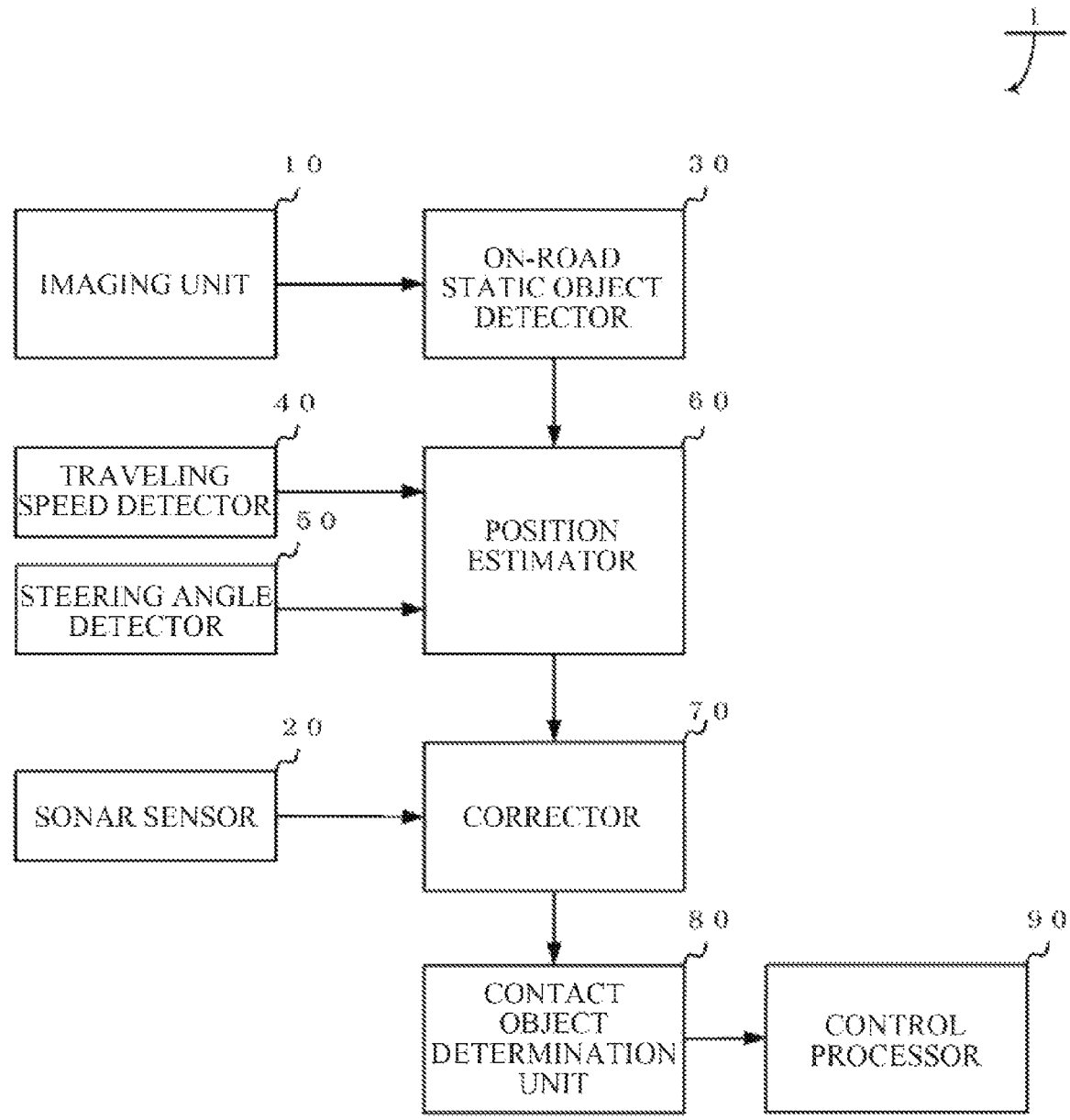
FIG. 1 is a block diagram of a configuration of a contact object detection apparatus according to one example embodiment of the disclosure.

In general, a camera is inferior to a sonar sensor in performance to detect an object at point-blank range. Accordingly, an object distant from a vehicle by a short to middle distance is detected based on an image captured by a camera, whereas an object distant from the vehicle by a very short to short distance is detected based on an output from an ultrasonic sonar sensor.

However, detection sensitivity of the sonar sensor has directivity, which can decrease accuracy in detecting an object present near an end of the field of view of the sonar sensor, for example.

It is desirable to provide a contact object detection apparatus and a non-transitory recording medium each of which makes it possible to accurately detect a contact object having a possibility of contact with a vehicle regardless of the position of the contact object present around the vehicle.

In the following, some example embodiments of the disclosure are described with reference to FIGS. 1 to 11. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

A contact object detection apparatus 1 according to a first example embodiment is described below with reference to FIGS. 1 to 8.

<Configuration of Contact Object Detection Apparatus 1>

As illustrated in FIG. 1, the contact object detection apparatus 1 according to the present example embodiment may include an imaging unit 10, a sonar sensor 20, an on-road static object detector 30, a traveling speed detector 40, a steering angle detector 50, a position estimator 60, a corrector 70, a contact object determination unit 80, and a control processor 90.

The imaging unit 10 may be, for example, a wide-angle monocular camera. The imaging unit 10 may capture an image of an environment behind a vehicle V and may send the captured image to the on-road static object detector 30 to be described later.

Figure 2:
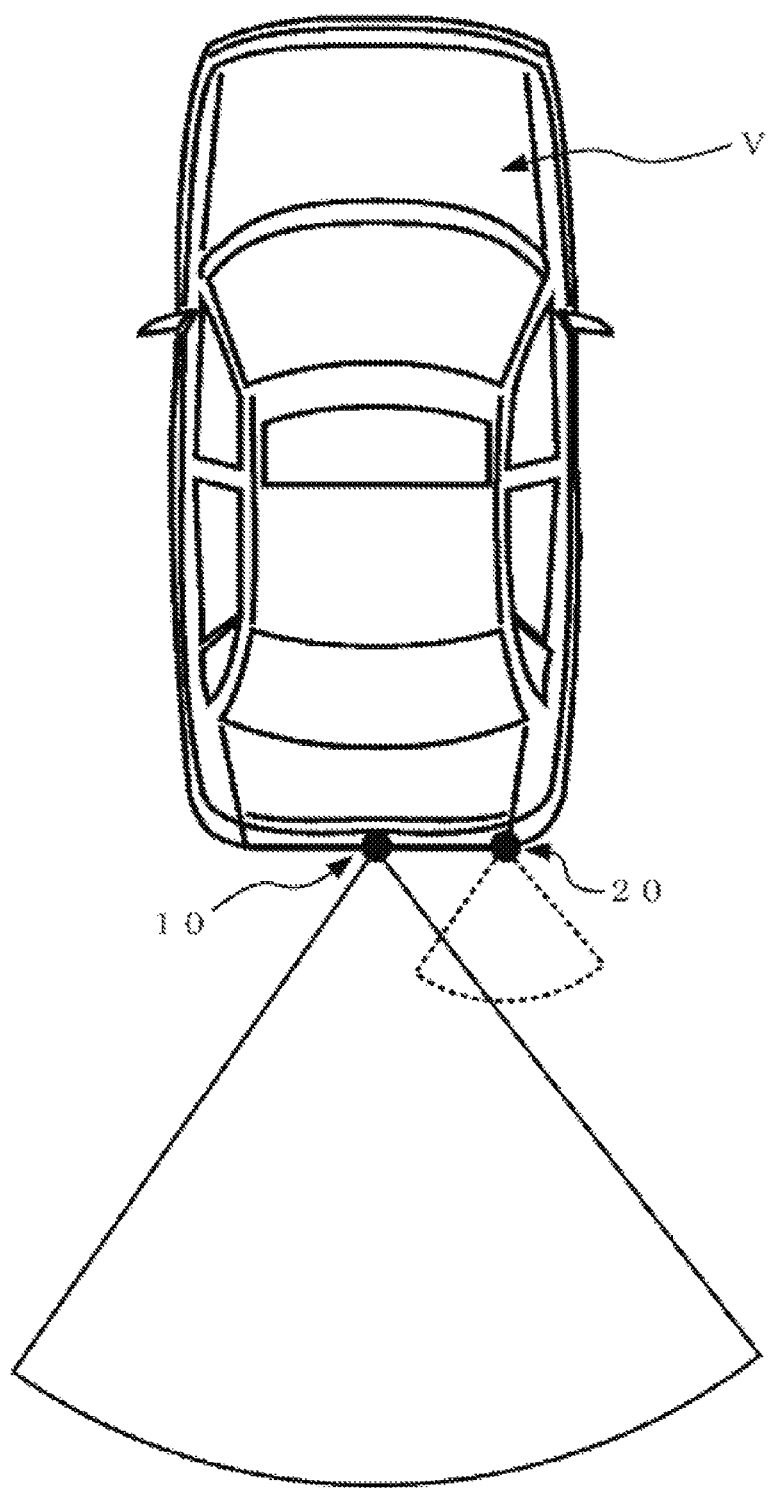
FIG. 2 is a diagram illustrating positions of a camera and a sonar sensor of the contact object detection apparatus according to one example embodiment of the disclosure.

As illustrated in FIG. 2, the imaging unit 10 may be disposed on a rear intermediate part of the vehicle V to capture an image of an environment behind the vehicle V, for example.

The imaging unit 10 may start capturing the image of the environment behind the vehicle V and send the captured image to the on-road static object detector 30 when a driver who drives the vehicle V performs an operation to move the vehicle V in a backward direction (e.g., when the driver shifts into reverse).

The sonar sensor 20 receives a reflective wave from a static object present on a road, and outputs a sensor output value based on the reflective wave.

In one example, the sonar sensor 20 may be an ultrasonic sonar sensor. The sonar sensor 20 may receive a reflective wave from a static object S present on a road (hereinafter referred to as an on-road static object S) within a fan-like range defined by a broken line in FIG. 2, and may output a sensor output value based on the magnitude of sound pressure of the detected reflective wave.

The sonar sensor 20 may send the sensor output value to the corrector 70.

Alternatively, a plurality of sonar sensors 20 may be disposed on a rear part of the vehicle V depending on performance (a detectable range) of each sonar sensor 20 to be disposed.

The on-road static object detector 30 may detect the on-road static object S from the image of the environment behind the vehicle V received from the imaging unit 10, and may calculate a position of the on-road static object S.

In the present example embodiment, the on-road static object detector 30 may detect the on-road static object S, such as a block or a pole, statically present in the backward direction relative to the vehicle V from the image received from the imaging unit 10, and may calculate the position of the on-road static object S.

For example, the on-road static object detector 30 may detect the on-road static object S present within a fan-like range defined by a solid line in FIG. 2, and may calculate the position of the on-road static object S.

Figure 3:
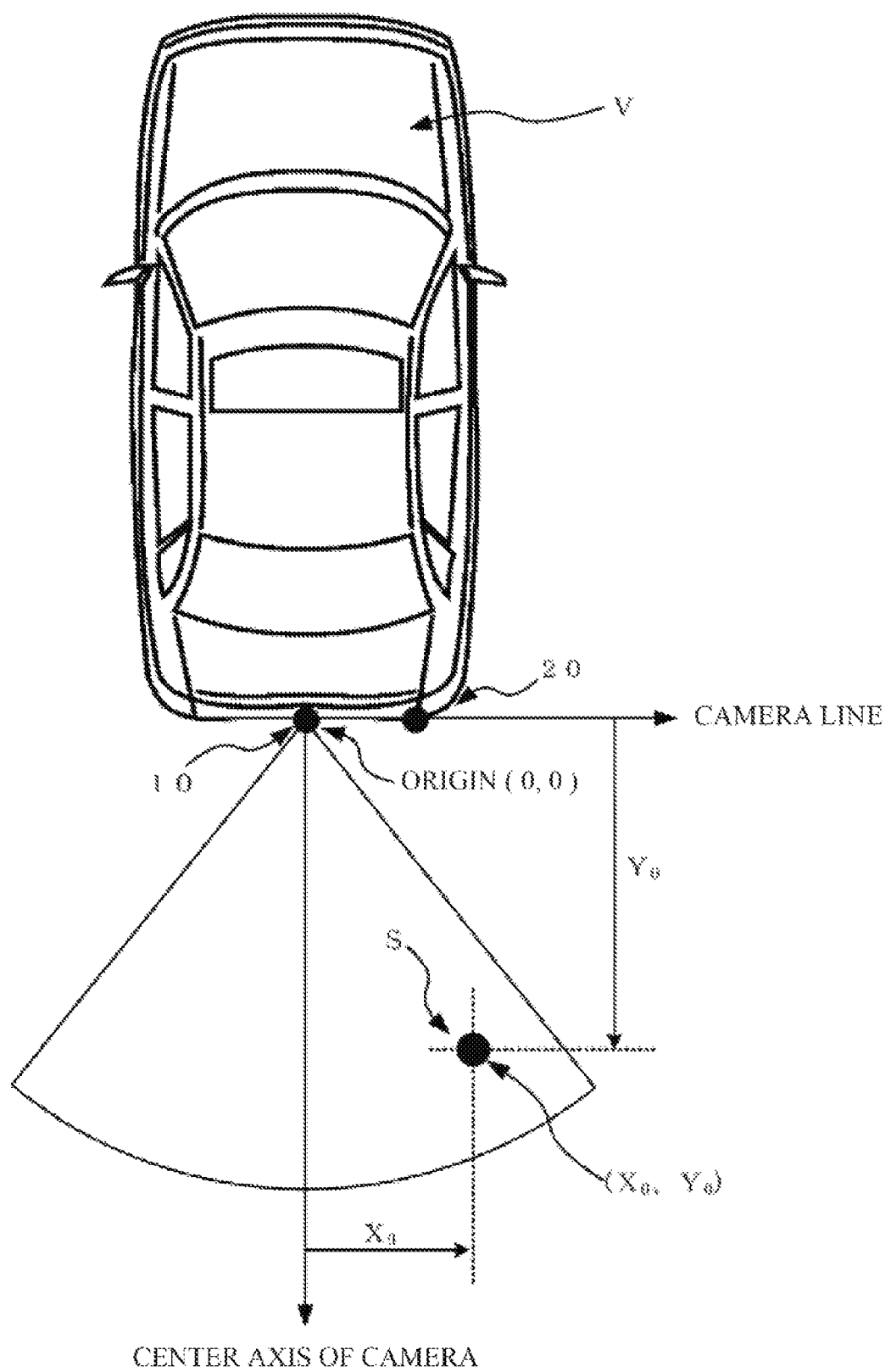
FIG. 3 is a diagram illustrating positional data on a position of an on-road static object to be detected by an on-road static object detector of the contact object detection apparatus according to one example embodiment of the disclosure.

Now, the position of the on-road static object S calculated by the on-road static object detector 30 is described in detail with reference to FIG. 3.

When detecting the on-road static object S in the backward direction relative to the vehicle V, the on-road static object detector 30 may calculate positional data $(X_0, Y_0)$ on the position of the on-road static object S.

In one example, the on-road static object detector 30 may calculate the positional data $(X_0, Y_0)$ on the position of the on-road static object S with reference to the position of the imaging unit 10 (including the camera) based on the image received from the imaging unit 10.

In more detail, the on-road static object detector 30 may calculate the positional data $(X_0, Y_0)$ on the position of the on-road static object S on a plane defined by a center axis of the camera (i.e., a center direction of the captured image) and a camera line perpendicular to the center axis of the camera with reference to an origin (0, 0) located at the position of the imaging unit 10.

Note that the on-road static object detector 30 may continuously calculate the positional data $(X_0, Y_0)$ while the on-road static object S is being detected from the image received from the imaging unit 10.

When the on-road static object S is no longer detectable from the image received from the imaging unit 10, the on-road static object detector 30 may send information indicating that the on-road static object S is no longer detectable from the image received from the imaging unit 10 to the position estimator 60 to be described later.

The traveling speed detector 40 may detect traveling speed data regarding the vehicle V, and may send the traveling speed data to the position estimator 60.

In one example, the traveling speed detector 40 may detect a traveling speed of the vehicle V as the traveling speed data, based on a vehicle-speed pulse signal of the vehicle V, for example.

The steering angle detector 50 may detect a current steering angle of a steering wheel operated by a driver who drives the vehicle V, and may send the steering angle data to the position estimator 60.

In one example, the steering angle detector 50 may detect the steering angle of the steering wheel based on an output from a turning angle sensor disposed on the steering wheel, for example.

In a case where the on-road static object S is no longer detectable by the on-road static object detector 30 due to traveling of the vehicle V in the backward direction, the position estimator 60 may estimate a current position of the on-road static object S based on the last position of the on-road static object S detected by the on-road static object detector 30, the traveling speed data regarding the vehicle V, and the steering angle data regarding the vehicle V. In addition, the position estimator 60 may calculate an angle θ between a center axis of the sonar sensor 20 and the estimated current position of the on-road static object S.

The position estimator 60 may calculate the positional data on the position of the on-road static object S with reference to the origin located at the position of the sonar sensor 20, based on the positional data on the position of the on-road static object S received from the on-road static object detector i.e., the positional data on the position of the on-road static object S with reference to the position of the imaging unit 10.

Figure 4:
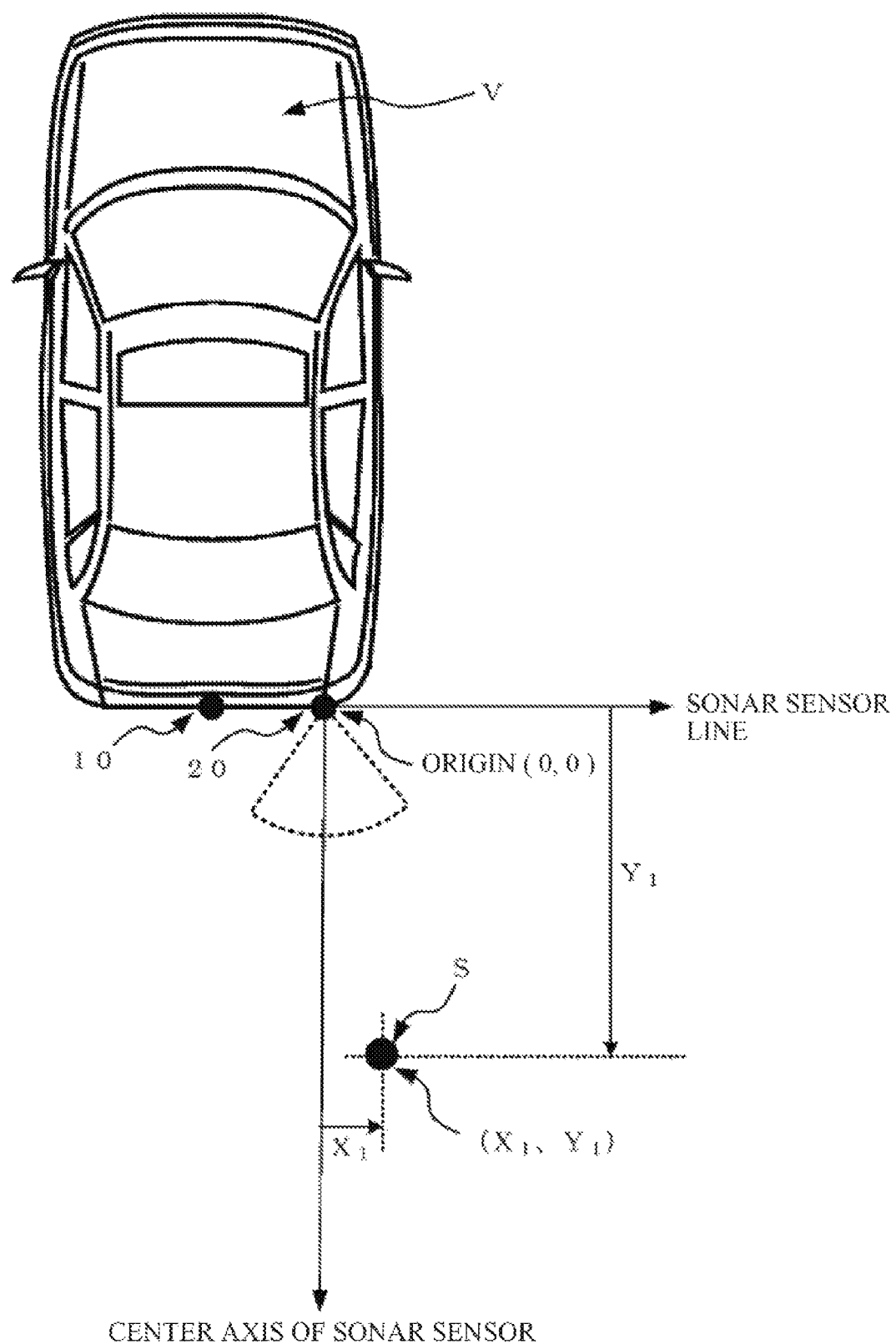
FIG. 4 is a diagram illustrating positional data on a position of the on-road static object to be calculated by a position estimator of the contact object detection apparatus according to one example embodiment of the disclosure.

In one example, as illustrated in FIG. 4, the position estimator 60 may calculate positional data $(X_1, Y_1)$ on the position of the on-road static object S on a plane defined by the center axis of the sonar sensor 20 and a sonar sensor line perpendicular to the center axis of the sonar sensor 20 with reference to an origin (0, 0) located at the position of the sonar sensor 20.

The position estimator 60 may calculate the positional data $(X_1, Y_1)$, based on data on the locations of the imaging unit 10 and the sonar sensor 20 (i.e., data on relative positions between the imaging unit 10 and the sonar sensor 20) preliminarily stored in a non-illustrated memory, and the positional data $(X_0, Y_0)$ received from the on-road static object detector 30.

Figure 5:
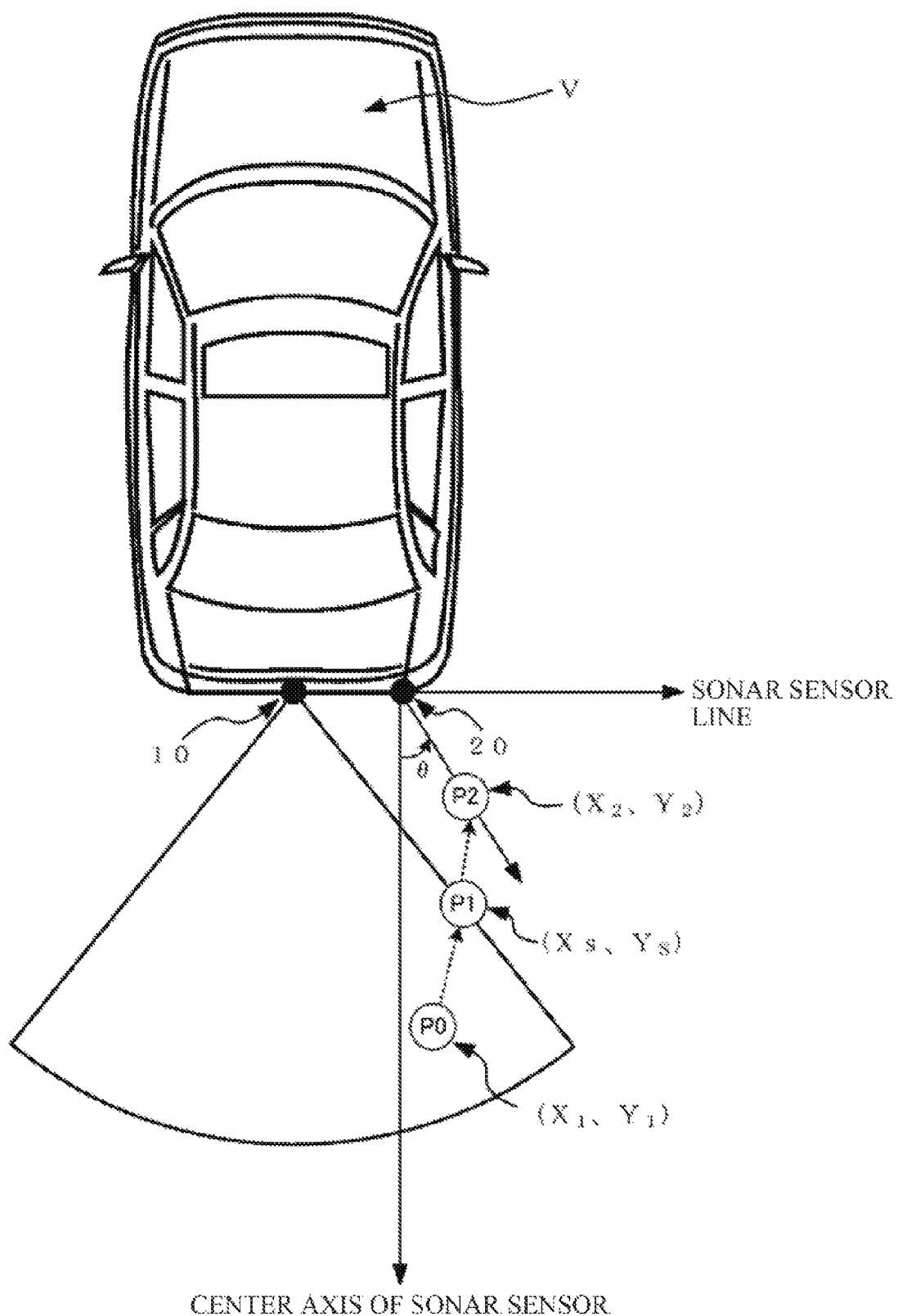
FIG. 5 is a diagram illustrating an angle to be calculated by the position estimator of the contact object detection apparatus according to one example embodiment of the disclosure.

FIG. 5 illustrates an exemplary case where the position of the on-road static object S moves from a position P0 via a position P1 to a position P2 while the vehicle V is traveling in the backward direction. When receiving the information indicating that the on-road static object S is no longer detectable from the on-road static object detector 30, the position estimator may calculate positional data $(X_2, Y_2)$ on a current position of the on-road static object S, based on positional data $(X_S, Y_S)$ on the last calculated position of the on-road static object S, the traveling speed data regarding the vehicle V acquired from the traveling speed detector 40, and the steering angle data acquired from the steering angle detector 50.

That is, based on the traveling speed data regarding the vehicle V and the steering angle data regarding the steering wheel, the position estimator 60 may calculate the positional data $(X_2, Y_2)$ on the current position P2 of the on-road static object S with reference to the positional data $(X_S, Y_S)$ on the last detected position P1 of the on-road static object S.

The position estimator 60 may calculate the angle θ between the center axis of the sonar sensor 20 and the estimated current position of the on-road static object S based on the calculated positional data $(X_2, Y_2)$, and may send the result of calculation to the corrector 70.

In a case where a plurality of sonar sensors 20 is disposed on the rear part of the vehicle V, the position estimator 60 may calculate the positional data $(X_2, Y_2)$ and the angle θ with reference to one sonar sensor 20 closest to the calculated position of the on-road static object S out of the sonar sensors 20.

Further, in the case where the plurality of sonar sensors 20 is disposed, the position estimator 60 may send identification data for identifying the sonar sensor 20 serving as the reference upon the estimation of the position of the on-road static object S to the corrector 70.

The corrector 70 corrects the sensor output value of the sonar sensor 20 based on a sensitivity correction amount for the sensor output value. The sensitivity correction amount may be determined based on the angle θ calculated by the position estimator 60.

The corrector 70 may output the corrected sensor output value to the contact object determination unit 80.

While the on-road static object S is being detected by the on-road static object detector 30, the corrector 70 may send the sensor output value acquired from the sonar sensor 20 to the contact object determination unit 80 without correcting the sensor output value of the sonar sensor 20.

Now, a description is given of the correction of the sensor output value at the corrector 70.

The sensor output value of the sonar sensor 20 may have directivity.

Figure 6:
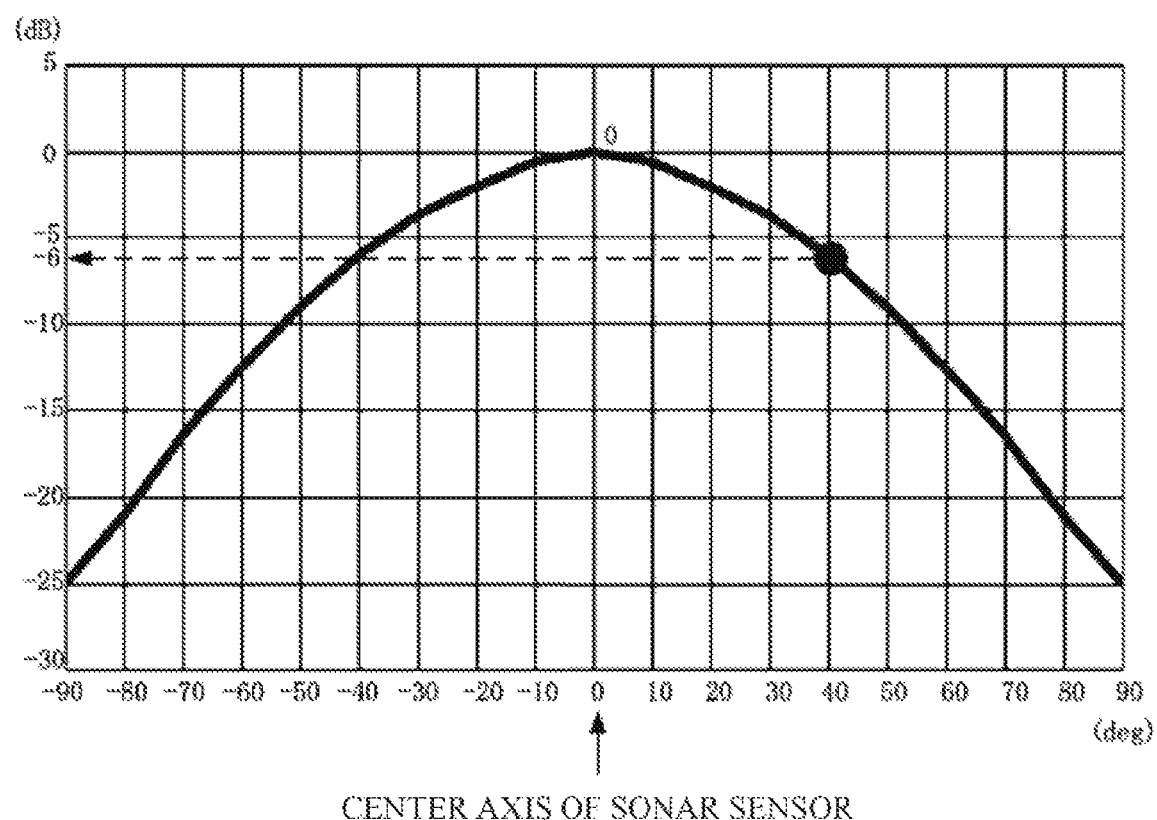
FIG. 6 is a diagram illustrating detection sensitivity of the sonar sensor of the contact object detection apparatus according to one example embodiment of the disclosure.

FIG. 6 illustrates an exemplary change in detection sensitivity depending on an angle from the center axis of the sonar sensor 20 with reference to 0 db detection sensitivity of the sonar sensor 20 along the center axis of the sonar sensor 20.

For example, the detection sensitivity of the sonar sensor 20 may be high along the center axis of the sonar sensor 20, and the sensor output value may thus take a large value along the center axis of the sonar sensor 20. As the angle from the center axis of the sonar sensor 20 increases, the detection sensitivity of the sonar sensor 20 may decrease, which reduces the sensor output value.

That is, even if the distance between the sonar sensor 20 and the on-road static object S is the same, the sensor output value of the sonar sensor 20 may change depending on the angle between the center axis of the sonar sensor and the position of the on-road static object S.

Accordingly, when receiving the information indicating that the on-road static object S having been detected is no longer detectable from the on-road static object detector 30, the corrector 70 may correct the sensor output value acquired from the sonar sensor 20 based on the sensitivity correction amount for the sensor output value. The sensitivity correction amount may be determined based on the angle θ received from the position estimator 60.

As illustrated in FIG. 6, for example, in a case where the on-road static object S is present along a direction shifted from the center axis of the sonar sensor 20 by 40 degrees (i.e., in a case where the angle θ is 40 degrees), the detection sensitivity of the sonar sensor 20 may be lower by 6 dB than the detection sensitivity along the central axis of the sonar sensor 20.

The corrector 70 may thus correct the sensor output value acquired from the sonar sensor 20 by adding 6 dB to the sensor output value.

In a case where a plurality of sonar sensors 20 is provided on the rear part of the vehicle V, the corrector 70 may acquire the sensor output value from one sonar sensor 20 serving as the reference upon the calculation of the angle θ by the position estimator 60 out of the sonar sensors 20, and may correct the received sensor output value.

Based on the sensor output value corrected by the corrector 70, the contact object determination unit 80 may determine whether the on-road static object S is an object having a possibility of contact with the vehicle V.

If the sensor output value corrected by the corrector 70 is greater than a predetermined threshold value, the contact object determination unit 80 may determine that the on-road static object S is the object having the possibility of contact with the vehicle V.

The contact object determination unit 80 may send the result of determination to the control processor 90.

The control processor 90 may control an overall operation of the contact object detection apparatus 1 in accordance with a control program stored in a non-illustrated read only memory (ROM), for example.

In the present example embodiment, in a case where the contact object determination unit 80 determines that the on-road static object S is the object having the possibility of contact with the vehicle V, for example, the control processor 90 may output an alarm or display a notification of the possibility of contact to the driver of the vehicle V.

In this case, the control processor 90 may acquire the sensor output value from the sonar sensor 20, may calculate the distance between the on-road static object S and the sonar sensor 20, and may change the type or volume of the alarm or the content of the notification to be displayed depending on the distance.

Note that the process in the contact object detection apparatus 1 is described in detail below.

<Process in Contact Object Detection Apparatus 1>

Figure 7:
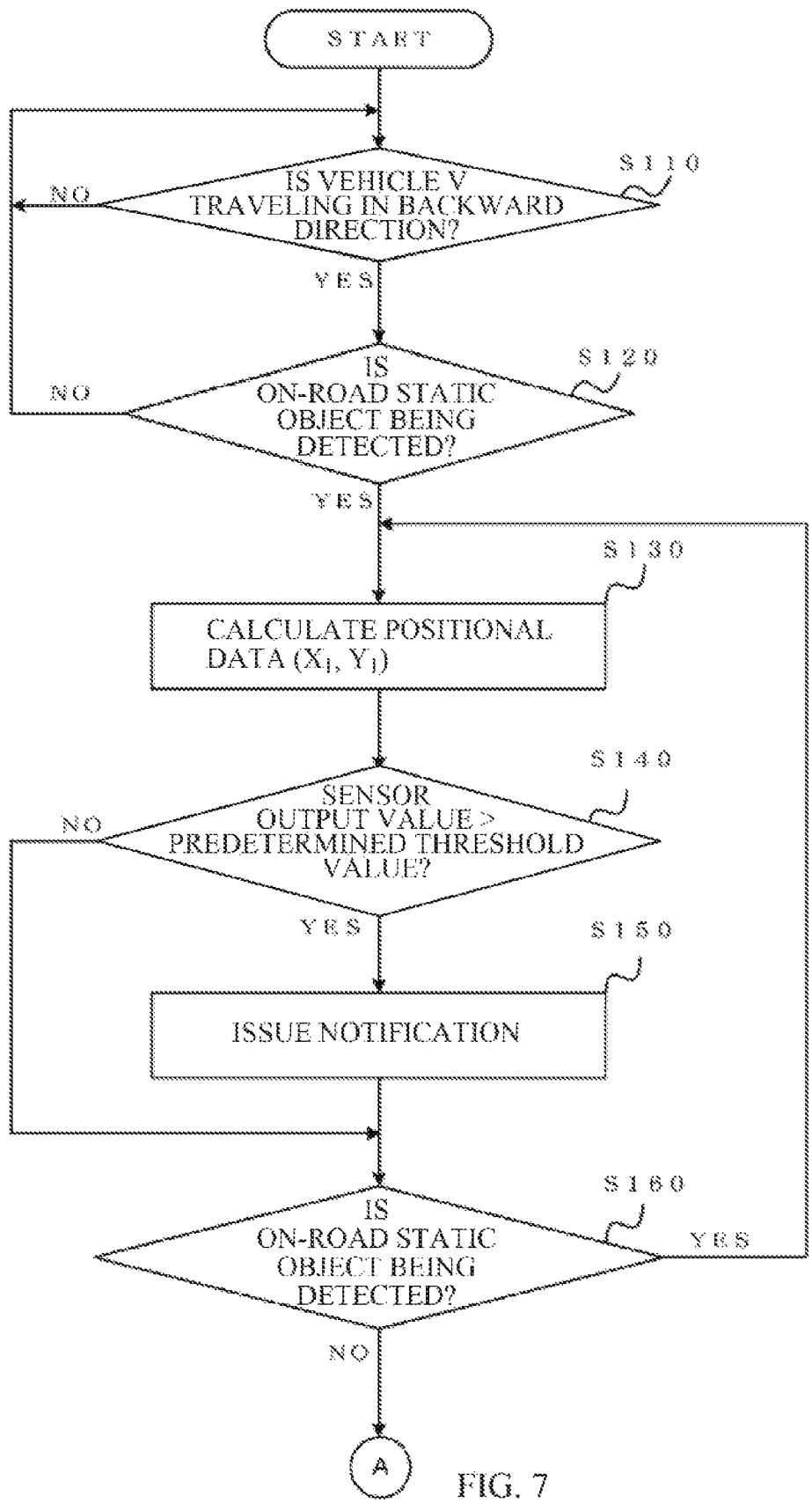
FIG. 7 is a flowchart of a process to be performed by the contact object detection apparatus according to one example embodiment of the disclosure.
Figure 8:
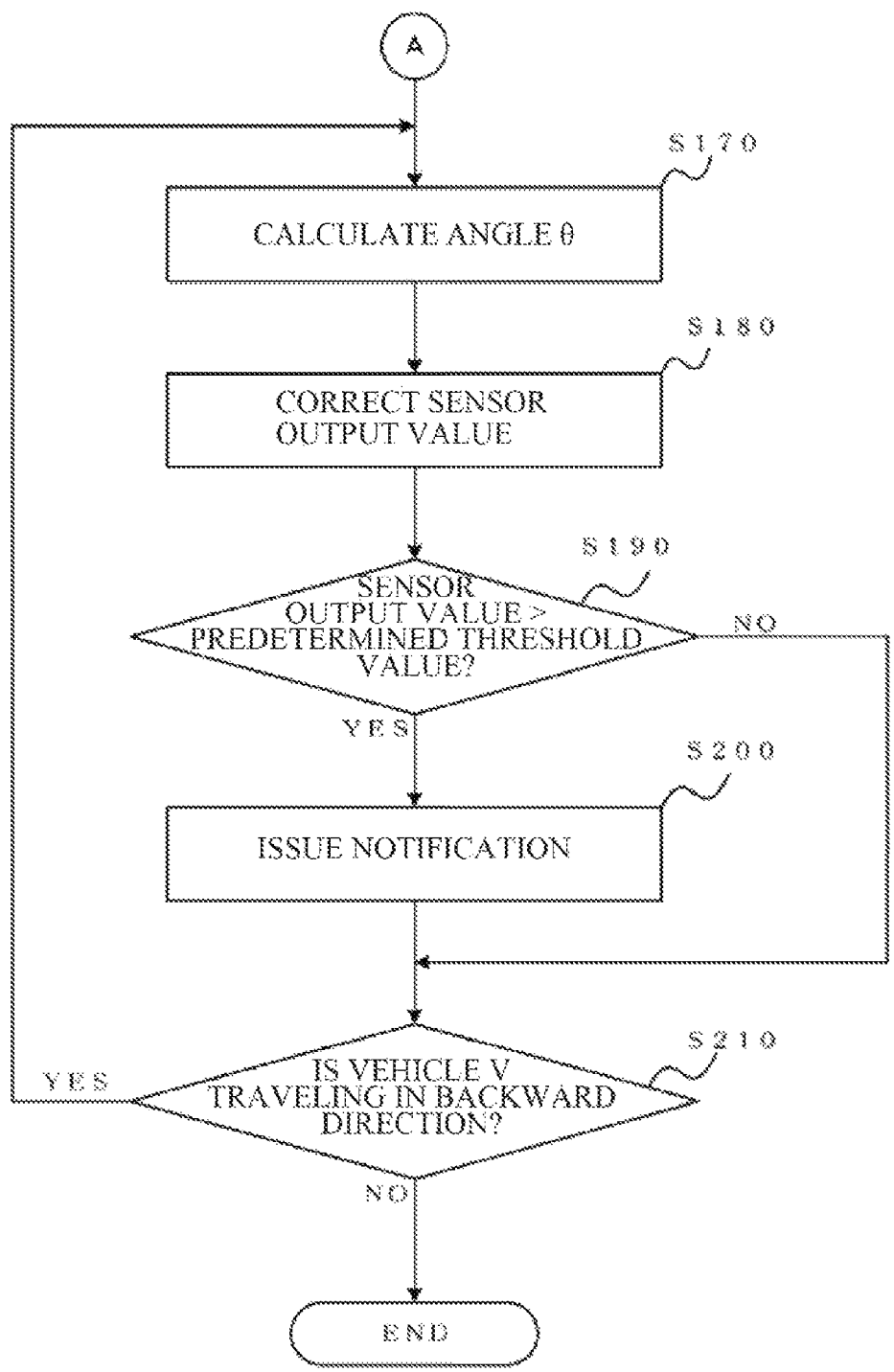
FIG. 8 is a flowchart of a process to be performed by the contact object detection apparatus according to one example embodiment of the disclosure.

An exemplary procedure of the process in the contact object detection apparatus 1 is described in detail below with reference to FIGS. 7 and 8.

First, a determination may be made as to whether the vehicle V is traveling in the backward direction (Step S110).

In one example, the control processor 90 may determine whether the vehicle V is traveling in the backward direction, based on shift lever position data.

If the control processor 90 determines that the vehicle V is traveling in the backward direction (Step S110: YES), the procedure may proceed to Step S120.

In contrast, if the control processor 90 determines that the vehicle V is not traveling in the backward direction (Step S110: NO), the procedure may return to Step S110 in which the procedure is switched to a stand-by mode.

If the control processor 90 determines that the vehicle V is traveling in the backward direction (Step S110: YES), the on-road static object detector 30 may determine whether the on-road static object S is being detected (Step S120).

If the on-road static object detector 30 determines that the on-road static object S is being detected (Step S120: YES), the procedure may proceed to Step S130.

In contrast, if the on-road static object detector 30 determines that the on-road static object S is not being detected (Step S120: NO), the procedure may return to Step S110 to continue the process.

If the on-road static object detector 30 determines that the on-road static object S is being detected (Step S120: YES), the position estimator 60 may calculate the positional data $(X_1, Y_1)$ of the on-road static object S (Step S130), following which the procedure may proceed to Step S140.

Note that the position estimator 60 may store the positional data $(X_1, Y_1)$ calculated in Step S120 in a non-illustrated memory, and may update the positional data stored in the memory every time when the positional data $(X_1, Y_1)$ of the on-road static object S is calculated.

In other words, the positional data $(X_S, Y_S)$ on the last calculated position of the on-road static object S may be stored in the memory.

The contact object determination unit 80 may determine whether the sensor output value received from the corrector 70 is greater than the predetermined threshold value (Step S140).

If the contact object determination unit 80 determines that the sensor output value received from the corrector 70 is greater than the predetermined threshold value (Step S140: YES), the procedure may proceed to Step S150.

In contrast, if the contact object determination unit 80 determines that the sensor output value received from the corrector 70 is not greater than the predetermined threshold value (Step S140: NO), the procedure may proceed to Step S160.

If the contact object determination unit 80 determines that the sensor output value received from the corrector 70 is greater than the predetermined threshold value (Step S140: YES), the control processor 90 may determine that the on-road static object S is the object having the possibility of contact with the vehicle V, and may issue a notification to the driver of the vehicle V (Step S150). Thereafter, the procedure may proceed to Step S160.

If the contact object determination unit 80 determines that the sensor output value received from the corrector 70 is not greater than the predetermined threshold value (Step S140: NO), the on-road static object detector 30 may determine whether the on-road static object S is being detected (Step S160).

In other words, the on-road static object detector 30 may determine whether the on-road static object S detected by the on-road static object detector 30 has moved to outside an imaging range of the imaging unit 10 due to traveling of the vehicle V in the backward direction.

If the on-road static object detector 30 determines that the on-road static object S is being detected (Step S160: YES), the procedure may return to Step S130 to continue the process.

In contrast, if the on-road static object detector 30 determines that the on-road static object S is not being detected (Step S160: NO), the procedure may proceed to Step S170.

If the on-road static object detector 30 determines that the on-road static object S is not being detected (Step S160: NO), the position estimator 60 may calculate the positional data $(X_2, Y_2)$ on the current position of the on-road static object S, and may calculate the angle θ based on the positional data $(X_2, Y_2)$ (Step S170).

That is, when the on-road static object S detected by the on-road static object detector 30 has moved to outside the imaging range of the imaging unit 10 due to traveling of the vehicle V in the backward direction, the position estimator 60 may estimate the positional data $(X_2, Y_2)$ on the current position of the on-road static object S, and may calculate the angle θ.

Note that, when receiving the information indicating that the on-road static object S is no longer detectable by the on-road static object detector 30, the position estimator 60 may calculate the positional data $(X_2, Y_2)$ on the current position of the on-road static object S with reference to the positional data stored in the memory in Step S130, i.e., the positional data $(X_S, Y_S)$ on the last detected position of the on-road static object S, and may calculate the angle θ based on the positional data $(X_2, Y_2)$.

Based on the angle θ calculated in Step S170, the corrector 70 may correct the sensor output value received from the sonar sensor 20 (Step S180), following which the procedure may proceed to Step S190.

For example, the corrector 70 may correct the sensor output value received from the sonar sensor 20 based on the sensitivity correction amount for the sensor output value of the sonar sensor 20. The sensitivity correction amount may be determined based on the angle θ received from the position estimator 60.

The contact object determination unit 80 may determine whether the sensor output value received from the corrector 70 is greater than the predetermined threshold value (Step S190).

If the contact object determination unit 80 determines that the sensor output value received from the corrector 70 is greater than the predetermined threshold value (Step S190: YES), the procedure may proceed to Step S200.

In contrast, the contact object determination unit 80 determines that the sensor output value received from the corrector 70 is not greater than the predetermined threshold value (Step S190: NO), the procedure may proceed to Step S210.

If the contact object determination unit 80 determines that the sensor output value received from the corrector 70 is greater than the predetermined threshold value (Step S190: YES), the control processor 90 may output an alarm or display a notification of the possibility of contact to the driver of the vehicle V (Step S200). Thereafter, the procedure may proceed to Step S210.

The control processor 90 may determine whether the vehicle V is traveling in the backward direction (Step S210).

If the control processor 90 determines that the vehicle V is traveling in the backward direction (Step S210: YES), the procedure may return to Step S170 to continue the process.

In contrast, if the control processor 90 determines that the vehicle V is not traveling in the backward direction (Step S210: NO), the process may end.

<Workings and Effects>

As descried above, the contact object detection apparatus 1 according to the first example embodiment includes the on-road static object detector 30, the sonar sensor 20, the position estimator 60, the corrector 70, the contact object determination unit 80, and the control processor 90. The on-road static object detector 30 detects the on-road static object S from the image of an environment behind the vehicle V captured by the imaging unit 10, to calculate a position of the on-road static object S. The sonar sensor 20 receives a reflective wave from the on-road static object S to output a sensor output value based on the reflective wave. When the on-road static object S is no longer detectable by the on-road static object detector 30 due to traveling of the vehicle V in the backward direction, the position estimator 60 estimates a current position of the on-road static object S, based on the last position of the on-road static object S detected by the on-road static object detector 30, the traveling speed data regarding the vehicle V, and the steering angle data regarding the vehicle V, to calculate the angle θ between the center axis of the sonar sensor 20 and the current position of the on-road static object S estimated by the position estimator 60. The corrector 70 corrects a decrease in the sensor output value caused by a decrease in detection sensitivity of the sonar sensor 20, based on the angle θ. The contact object determination unit determines whether the on-road static object S is the object having the possibility of contact with the vehicle V, based on the sensor output value corrected by the corrector 70.

That is, when receiving the information indicating that the on-road static object S having been detected is no longer detectable from the on-road static object detector 30, the corrector 70 may correct the sensor output value acquired from the sonar sensor 20 based on the sensitivity correction amount for correcting the sensor output value. The sensitivity correction amount may be determined based on the angle θ received from the position estimator 60.

Based on the sensor output value corrected by the corrector 70, the contact object determination unit 80 may determine whether the on-road static object S is the object having the possibility of contact with the vehicle V. Accordingly, even when the on-road static object S is present outside the imaging range of the imaging unit 10, it is possible to accurately determine whether the on-road static object S is the object having the possibility of contact with the vehicle V. This makes it possible to enhance safety of the vehicle V to avoid the contact.

Further, because the sensor output value of the sonar sensor 20 is corrected by the corrector 70, the contact object determination unit 80 is able to determine whether the on-road static object S is the object having the possibility of contact with the vehicle V using the same predetermined threshold value regardless of the position of the on-road static object S.

In a case where the contact object determination unit 80 determines that the on-road static object S is the object having the possibility of contact with the vehicle V, the control processor 90 may output an alarm or display a notification of the possibility of contact to the driver. This makes it possible to reduce the possibility of contact between the vehicle V and the on-road static object S.

Even if the on-road static object S is present at an end of the field of view (FOV) of the sonar sensor 20, it is possible to detect the on-road static object S without missing the on-road static object S because the sensor output value of the sonar sensor 20 is corrected based on the sensitivity correction amount determined based on the angle θ.

This makes it possible to broaden the detection range of each sonar sensor 20, reducing the number of sonar sensors 20 to be disposed on the vehicle V. It is therefore possible to reduce costs of the contact object detection apparatus 1.

Further, because the sensor output value of the sonar sensor 20 is corrected based on the angle θ, it is possible to achieve high detection performance even in a case of using an inexpensive sonar sensor having a narrow FOV as in a case of using a sonar sensor having a large FOV.

This allows an inexpensive sonar sensor having a narrow field of view to be applied to the contact object detection apparatus 1. It is therefore possible to reduce costs of the contact object detection apparatus 1.

Second Example Embodiment

A contact object detection apparatus 1A according to a second example embodiment is described below with reference to FIGS. 9 to 11.

Note that components denoted by the same reference numerals as those of the components in the first example embodiment have the same functions as the components in the first example embodiment, and descriptions thereof are thus omitted.

<Configuration of Contact Object Detection Apparatus 1A>

Figure 9:
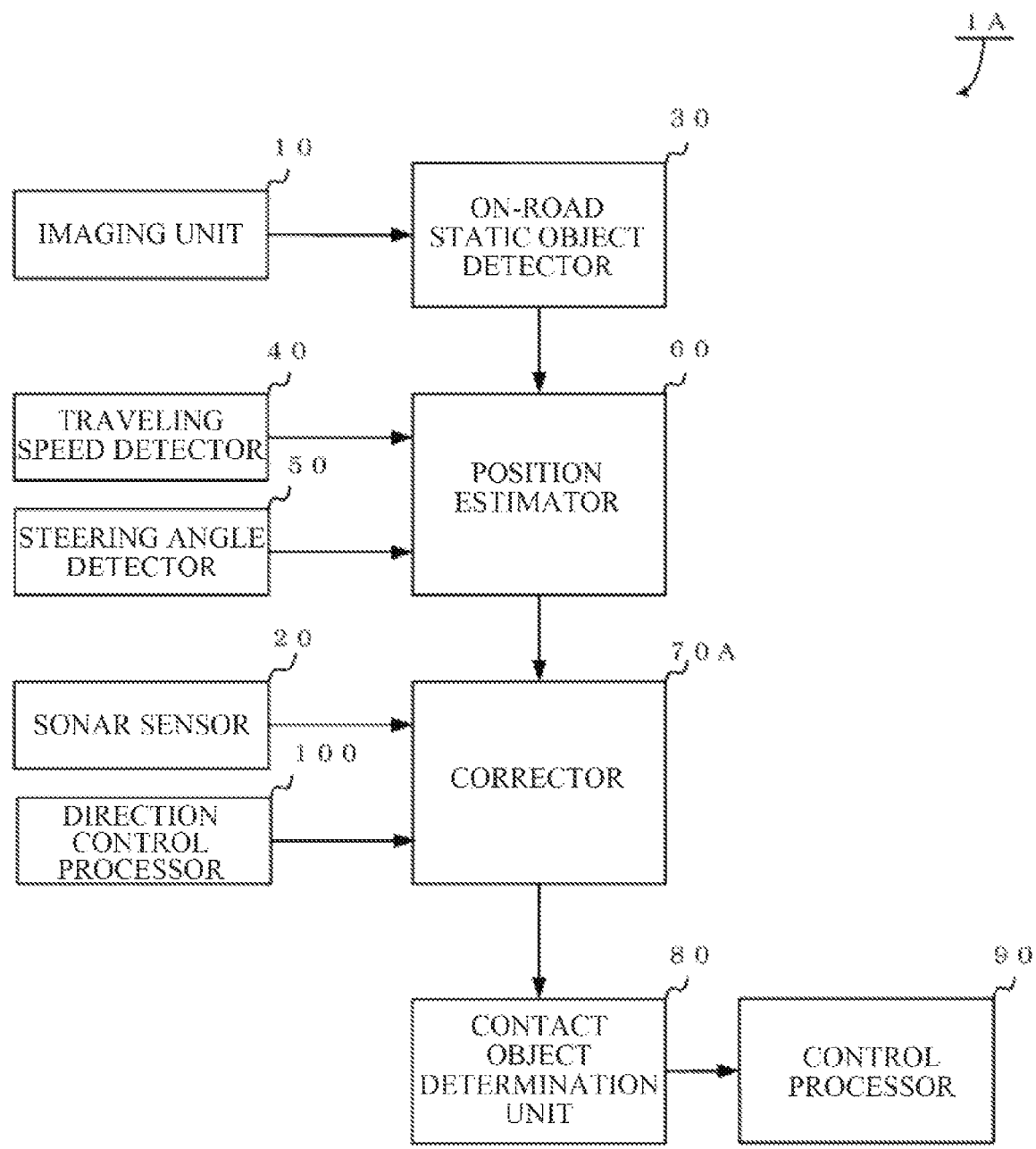
FIG. 9 is a block diagram of a configuration of a contact object detection apparatus according to one example embodiment.

As illustrated in FIG. 9, the contact object detection apparatus 1A according to the present example embodiment may include the imaging unit 10, the sonar sensor 20, the on-road static object detector 30, the traveling speed detector 40, the steering angle detector 50, the position estimator 60, a corrector 70A, the contact object determination unit 80, the control processor and a direction control processor 100.

The corrector 70A may output, to the direction control processor 100 to be described later, such a control amount that changes the direction of the center axis of the sonar sensor 20 by the angle θ to thereby correct a decrease in the sensor output value.

For example, the corrector 70A may send the direction control processor 100 an instruction to change the orientation of the sonar sensor 20 so that the direction of the center axis of the sonar sensor 20 is changed by the angle θ. After the direction of the center axis of the sonar sensor 20 is changed by the direction control processor 100, the corrector 70A may acquire the sensor output value from the sonar sensor 20.

The corrector 70A may send the sensor output value acquired as the corrected sensor output value to the contact object determination unit 80.

In a case where a plurality of sonar sensors 20 is disposed, the corrector 70A may send the direction control processor 100 identification data for identifying one sonar sensor 20 to be changed in orientation out of the sonar sensors 20.

The direction control processor 100 may change the direction of the center axis of the sonar sensor 20.

In one example, the direction control processor 100 may change the orientation of the sonar sensor 20 based on the angle θ received from the corrector 70A so that the direction of the center axis of the sonar sensor 20 becomes identical to the direction in which the on-road static object S is present.

Figure 10:
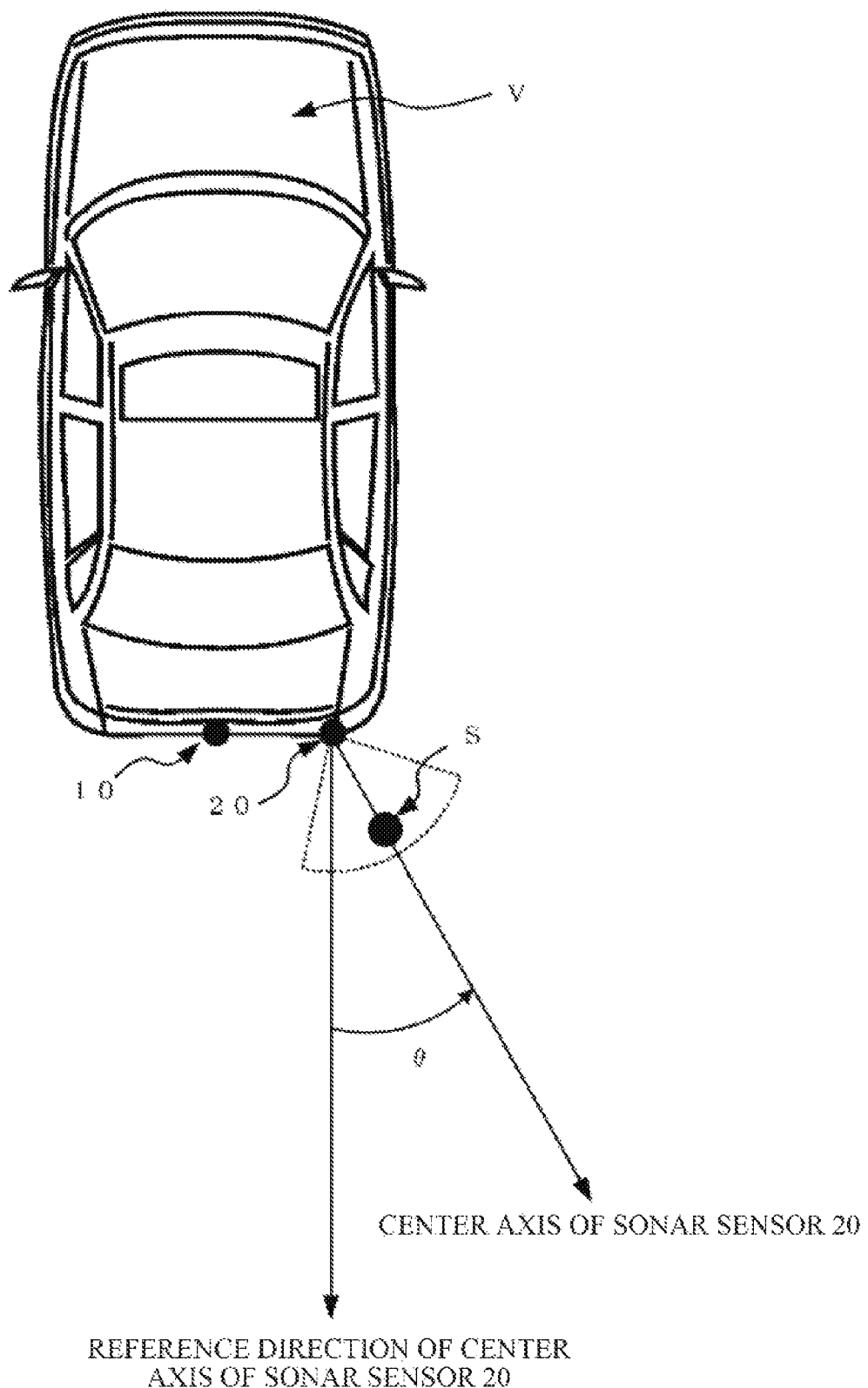
FIG. 10 is a diagram illustrating control to change an orientation of a sonar sensor of the contact object detection apparatus according to one example embodiment of the disclosure.
Figure 11:
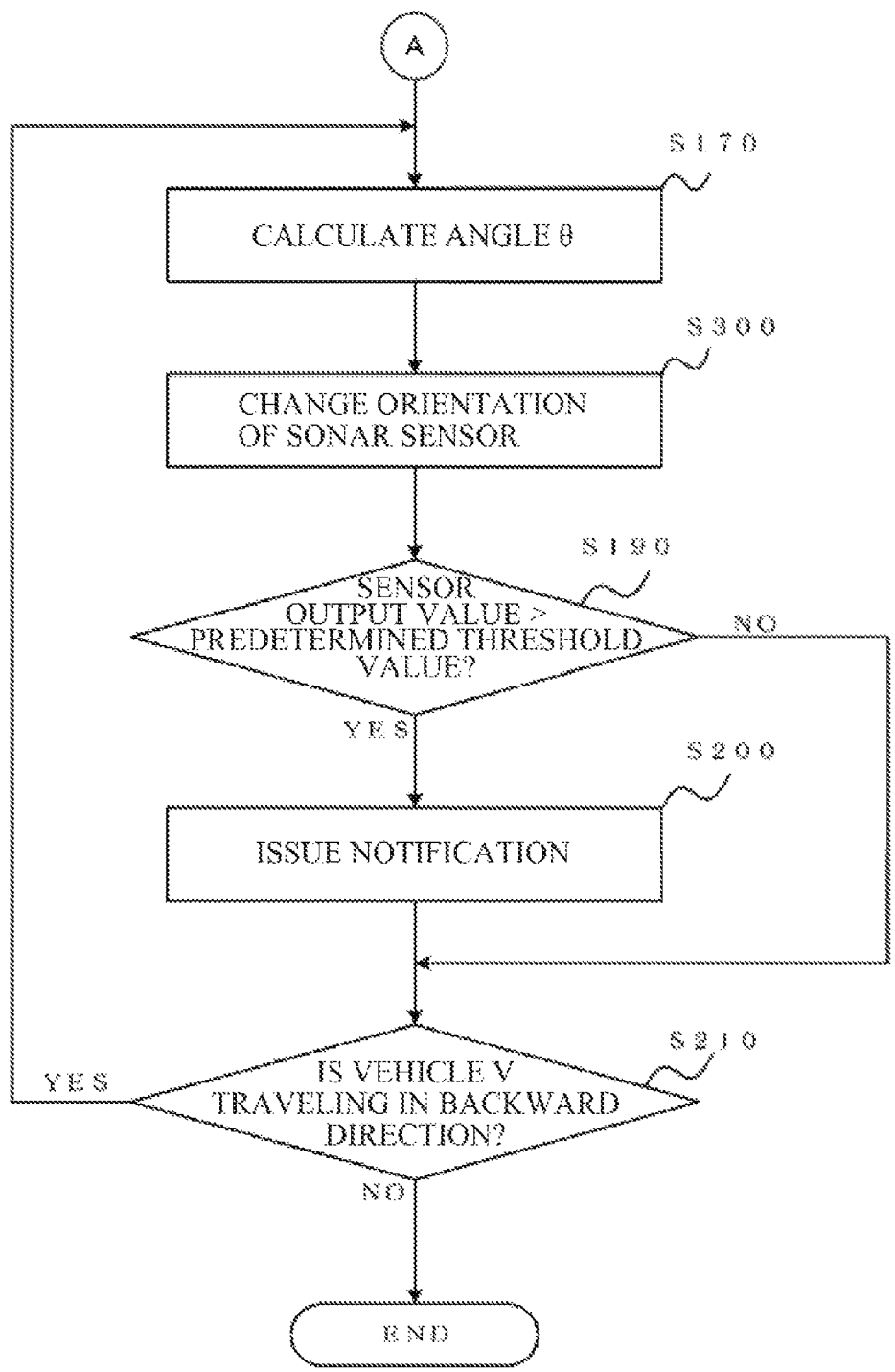
FIG. 11 is a flowchart of a process to be performed by the contact object detection apparatus according to one example embodiment of the disclosure.

In more detail, as illustrated in FIG. 10, the direction control processor 100 may control the orientation of the sonar sensor 20 so that the angle θ is defined between a reference direction of the center axis of the sonar sensor 20 and the center axis of the sonar sensor 20.

In a case where a plurality of sonar sensors 20 is disposed, the direction control processor 100 may change the orientation of the one sonar sensor 20 identified based on the identification data received from the corrector 70A.

<Process in Contact Object Detection Apparatus 1A>

An exemplary procedure of the process in the contact object detection apparatus 1A is described in detail below with reference to FIG. 11.

Note that, in the following, a description is given only of Step S300 which is not included in the process in the contact object detection apparatus 1 according to the first example embodiment.

The corrector 70A may send the direction control processor 100 an instruction to change the direction of the center axis of the sonar sensor 20 by the angle θ. After the direction of the center axis of the sonar sensor 20 is changed by the direction control processor 100, the corrector 70A may acquire the sensor output value from the sonar sensor 20 (Step S300).

<Workings and Effects>

As descried above, the contact object detection apparatus 1A according to the second example embodiment includes the on-road static object detector the sonar sensor 20, the position estimator 60, the corrector 70A, the contact object determination unit 80, the control processor 90, and the direction control processor 100. The on-road static object detector 30 detects the on-road static object S from the image of the environment behind the vehicle V captured by the imaging unit 10, to calculate a position of the on-road static object S. The sonar sensor 20 receives a reflective wave from the on-road static object S to output a sensor output value based on the reflective wave. When the on-road static object S is no longer detectable by the on-road static object detector 30 due to traveling of the vehicle V in the backward direction, the position estimator 60 may estimate a current position of the on-road static object S, based on the last position of the on-road static object S detected by the on-road static object detector 30, the traveling speed data regarding the vehicle V, and the steering angle data regarding the vehicle V, to calculate the angle θ between the center axis of the sonar sensor 20 and the current position of the on-road static object S estimated by the position estimator 60. The corrector 70A corrects the decrease in the sensor output value caused by the decrease in detection sensitivity of the sonar sensor 20, based on the angle θ. The contact object determination unit 80 determines whether the on-road static object S is the object having the possibility of contact with the vehicle V, based on the sensor output value corrected by the corrector 70A. The direction control processor 100 may control the direction of the center axis of the sonar sensor 20.

The corrector 70A may output, to the direction control processor 100, such a control amount that changes the direction of the center axis of the sonar sensor 20 by the angle θ to thereby correct the decrease in the sensor output value.

That is, the corrector 70A may change the direction of the center axis of the sonar sensor 20 to the direction in which the position of the on-road static object S estimated by the position estimator 60 is located, and thereafter may acquire the sensor output value from the sonar sensor 20.

The corrector 70A is thus able to acquire the sensor output value from the sonar sensor 20 at an angle where the detection sensitivity of the sensor output value of the sonar sensor 20 does not decrease.

Based on the sensor output value corrected by the corrector 70A, the contact object determination unit 80 may determine whether the on-road static object S is the object having the possibility of contact with the vehicle V. Accordingly, even when the on-road static object S is present outside the imaging range of the imaging unit 10, it is possible to accurately determine whether the on-road static object S is the object having the possibility of contact with the vehicle V. This makes it possible to enhance safety of the vehicle V to avoid the contact.

Further, because the corrector 70A may acquire the sensor output value from the sonar sensor 20 after controlling the orientation of the sonar sensor the contact object determination unit 80 is able to determine whether the on-road static object S is the object having the possibility of contact with the vehicle V using the same predetermined threshold value regardless of the position of the on-road static object S.

Even if the on-road static object S is present at an end of the field of view (FOV) of the sonar sensor 20, the corrector 70A may acquire the sensor output value from the sonar sensor 20 after the direction of the center axis of the sonar sensor 20 is changed to the direction in which the estimated position of the on-road static object S is located.

This makes it possible to broaden the detection range of each sonar sensor 20, reducing the number of sonar sensors 20 to be disposed on the vehicle V. It is therefore possible to reduce costs of the contact object detection apparatus 1A.

Further, because the corrector 70A acquires the sensor output value from the sonar sensor 20 after the direction of the center axis of the sonar sensor 20 is changed to the direction in which the estimated position of the on-road static object S is located, it is possible to apply an inexpensive sonar sensor having a narrow FOV to the contact object detection apparatus 1A.

It is therefore possible to reduce costs of the contact object detection apparatus 1A.

Modification Example 1

The on-road static object detector 30 described in the foregoing example embodiments may detect the on-road static object S from the image captured by the wide-angle monocular camera. However, a stereo camera, a Lidar, a millimeter-wave radar, or the like may be alternatively used to detect the on-road static object S as long as the detection of the on-road static object S and the identification of the position of the on-road static object S are available.

This makes it possible to reduce influences of external factors such as the weather or surrounding brightness on the detection of the position of the on-road static object S. It is therefore possible to improve accuracy in detecting the position of the on-road static object S.

Further, even when the on-road static object S is no longer detectable by the on-road static object detector 30, the position estimator 60 calculates the positional data on the current position of the on-road static object S based on the positional data on the position of the on-road static object S detected with the improved accuracy. It is therefore possible to improve the accuracy in detecting the position of the on-road static object S.

Modification Example 2

The contact object detection apparatuses 1 and 1A described in the foregoing example embodiments may determine whether the on-road static object S is the object having the possibility of contact with the vehicle V while the vehicle V is traveling in the backward direction. However, the imaging unit 10 and the sonar sensor 20 may be disposed on a frontal portion of the vehicle V, and the determination as to whether the on-road static object S is the object having the possibility of contact with the vehicle V may be made while the vehicle V is traveling in the forward direction.

This enables the contact object detection apparatuses 1 and 1A to detect a low-profile object, such as a low-height block, having the possibility of contact with the vehicle V but visually unrecognizable by the driver. This makes it possible to enhance the safety of the vehicle V to avoid the contact.

Modification Example 3

In a case where the position of the on-road static object S estimated by the position estimator 60 is located outside the angular range that the direction control processor 100 is able to control, the corrector 70A may correct the decrease in the sensor output value through a combination of the correction to change the direction of the center axis of the sonar sensor 20 and the correction of the sensor output value based on the sensitivity correction amount for the sensor output value. The sensitivity correction amount may be determined based on the angle θ between the center axis of the sonar sensor 20 and the estimated position of the on-road static object S.

For example, the corrector 70A may set the direction of the center axis of the sonar sensor 20 to a maximum angle that the direction control processor 100 is able to control, and thereafter may acquire the sensor output value from the sonar sensor 20.

Thereafter, the corrector 70A may calculate an angle θ1 between the center axis of the sonar sensor 20 set at the maximum angle and the estimated position of the on-road static object S, and may correct the acquired sensor output value based on the sensitivity correction amount for the sensor output value. The sensitivity correction amount may be determined based on the angle θ1.

Accordingly, even when the position of the on-road static object S estimated by the position estimator 60 is located outside the angular range that the direction control processor 100 is able to control, the corrector 70A makes it possible to correct the decrease in the sensor output value.

Based on the sensor output value corrected by the corrector 70A, the contact object determination unit 80 may determine whether the on-road static object S is the object having the possibility of contact with the vehicle V. It is therefore possible to accurately determine whether the on-road static object S is the object having a possibility of contact with the vehicle V. This makes it possible to enhance the safety of the vehicle V to avoid the contact.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

According to one or more of the foregoing example embodiments of the disclosure, it is possible to accurately detect an object having a possibility of contact with a vehicle regardless of the position of the object present around the vehicle.

One or more of the on-road static object detector 30, the position estimator 60, the correctors 70 and 70A, and the contact object determination unit 80 in FIGS. 1 and 9 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the on-road static object detector 30, the position estimator 60, the correctors 70 and 70A, and the contact object determination unit 80. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the on-road static object detector 30, the position estimator 60, the correctors 70 and 70A, and the contact object determination unit 80 in FIGS. 1 and 9.

The invention claimed is:

1. A contact object detection apparatus to be applied to a vehicle, the contact object detection apparatus comprising:
    an on-road static object detector configured to detect an on-road static object from a captured image of an environment behind the vehicle to calculate a position of the on-road static object;
    a sonar sensor configured to receive a reflective wave from the on-road static object to output a sensor output value based on the reflective wave;
    a position estimator configured to, when the on-road static object is no longer detectable by the on-road static object detector due to traveling of the vehicle in a backward direction, estimate a current position of the on-road static object, based on a last position of the on-road static object detected by the on-road static object detector, traveling speed data regarding the vehicle, and steering angle data regarding the vehicle, to calculate an angle between a center axis of the sonar sensor and the current position of the on-road static object estimated by the position estimator;
    a corrector configured to correct a decrease in the sensor output value caused by a decrease in detection sensitivity of the sonar sensor, based on the angle calculated by the position estimator; and
    a contact object determination unit configured to determine whether the on-road static object is an object having a possibility of contact with the vehicle, based on the sensor output value corrected by the corrector.

2. The contact object detection apparatus according to claim 1, wherein the corrector is configured to correct the decrease in the sensor output value based on a sensitivity correction amount for the sensor output value, the sensitivity correction amount being determined based on the angle calculated by the position estimator.

3. The contact object detection apparatus according to claim 1, further comprising a direction control processor configured to change a direction of the center axis of the sonar sensor, wherein
    the corrector is configured to correct the decrease in the sensor output value by outputting, to the direction control processor, such a control amount that changes the direction of the center axis of the sonar sensor by the angle.

4. The contact object detection apparatus according to claim 2, wherein the contact object determination unit is configured to determine that the on-road static object is the object having the possibility of the contact with the vehicle when the sensor output value corrected by the corrector is greater than a predetermined threshold value.

5. The contact object detection apparatus according to claim 3, wherein the contact object determination unit is configured to determine that the on-road static object is the object having the possibility of the contact with the vehicle when the sensor output value corrected by the corrector is greater than a predetermined threshold value.

6. A non-transitory computer readable recording medium containing a program that causes, when executed by a computer, the computer to implement a method of detecting a contact object having a possibility of contact with a vehicle using a contact object detection apparatus, the contact object detection apparatus comprising an on-road static object detector, a sonar sensor, a position estimator, a corrector, and a contact object determination unit, the method comprising:
    detecting, with the on-road static object detector, an on-road static object from a captured image of an environment behind the vehicle to calculate a position of the on-road static object;
    receiving, with the sonar sensor, a reflective wave from the on-road static object to output a sensor output value based on the reflective wave;
    when the on-road static object is no longer detectable by the on-road static object detector due to traveling of the vehicle in a backward direction, estimating, with the position estimator, a current position of the on-road static object based on a last position of the on-road static object detected by the on-road static object detector, traveling speed data regarding the vehicle, and steering angle data regarding the vehicle, to calculate an angle between a center axis of the sonar sensor and the current position of the on-road static object estimated by the position estimator;
    correcting, with the corrector, a decrease in the sensor output value caused by a decrease in detection sensitivity of the sonar sensor based on the angle calculated by the position estimator; and
    determining, with the contact object determination unit, whether the on-road static object is the object having the possibility of the contact with the vehicle based on the sensor output value corrected by the corrector.

7. A contact object detection apparatus to be applied to a vehicle, the contact object detection apparatus comprising:
    a sonar sensor configured to receive a reflective wave from an on-road static object to output a sensor output value based on the reflective wave; and
    circuitry configured to
    detect an on-road static object from a captured image of an environment behind the vehicle,
    calculate a position of the on-road static object,
    when the on-road static object is no longer detectable due to traveling of the vehicle in a backward direction, estimate a current position of the on-road static object based on a last detected position of the on-road static object, traveling speed data regarding the vehicle, and steering angle data regarding the vehicle,
    calculate an angle between a center axis of the sonar sensor and the current position of the on-road static object estimated,
    correct a decrease in the sensor output value caused by a decrease in detection sensitivity of the sonar sensor, based on the angle calculated, and determine whether the on-road static object is an object having a possibility of contact with the vehicle, based on the sensor output value corrected.

8. The contact object detection apparatus according to claim 7, wherein the circuitry is further configured to correct the decrease in the sensor output value based on a sensitivity correction amount for the sensor output value, the sensitivity correction amount being determined based on the angle calculated by the position estimator.

9. The contact object detection apparatus according to claim 7, wherein the circuitry is further configured to:
change a direction of the center axis of the sonar sensor; and
correct the decrease in the sensor output value by outputting such a control amount that changes the direction of the center axis of the sonar sensor by the angle.

10. The contact object detection apparatus according to claim 8 wherein the circuitry is further configured to determine that the on-road static object is the object having the possibility of the contact with the vehicle when the corrected sensor output value is greater than a predetermined threshold value.

11. The contact object detection apparatus according to claim 9 wherein the circuitry is further configured to determine that the on-road static object is the object having the possibility of the contact with the vehicle when the corrected sensor output value is greater than a predetermined threshold value.

* * * * *